US006732368B1

United States Patent
Michael et al.

(10) Patent No.: US 6,732,368 B1
(45) Date of Patent: May 4, 2004

(54) METHOD AND APPARATUS FOR PROVIDING VOICE/UNIFIED MESSAGING SERVICES USING CATV TERMINALS

(75) Inventors: Erez Michael, Petach Tiqwa (IL); Shlomi Kringel, Ramat Gan (IL)

(73) Assignee: Comverse, Ltd., Tele-Aviv (IL)

( * ) Notice: Subject to any disclaimer, the term of this patent is extended or adjusted under 35 U.S.C. 154(b) by 0 days.

(21) Appl. No.: 09/473,294

(22) Filed: Dec. 28, 1999

(51) Int. Cl.[7] .......................... H04N 7/025; H04N 7/10; H04N 7/173
(52) U.S. Cl. .......................... 725/34; 725/32; 725/115; 725/117; 725/109
(58) Field of Search .......................... 348/14.01; 725/32, 725/34, 115, 117, 109; 379/90.01; 709/200

(56) References Cited

U.S. PATENT DOCUMENTS

| | | | | |
|---|---|---|---|---|
| 4,837,798 A | * | 6/1989 | Cohen et al. ............ 379/88.14 |
| 5,187,735 A | * | 2/1993 | Herrero Garcia et al. ............ 379/88.17 |
| 5,260,778 A | * | 11/1993 | Kauffman et al. ............ 725/33 |
| 5,479,491 A | * | 12/1995 | Herrero Garcia et al. ............ 379/88.15 |
| 5,497,186 A | * | 3/1996 | Kawasaki ............ 725/34 |
| 5,512,935 A | * | 4/1996 | Majeti et al. ............ 725/33 |
| 5,608,786 A | * | 3/1997 | Gordon ............ 370/352 |
| 5,668,855 A | | 9/1997 | Misholi et al. |
| 5,835,126 A | * | 11/1998 | Lewis ............ 725/83 |
| 5,896,556 A | | 4/1999 | Moreland et al. |
| 6,002,394 A | * | 12/1999 | Schein et al. ............ 725/39 |
| 6,233,318 B1 | * | 5/2001 | Picard et al. ............ 379/88.17 |
| 6,411,685 B1 | * | 6/2002 | O'Neal ............ 379/88.14 |
| 6,438,217 B1 | * | 8/2002 | Huna ............ 379/88.14 |
| 6,484,317 B1 | * | 11/2002 | Wright ............ 725/32 |
| 6,529,500 B1 | * | 3/2003 | Pandharipande ............ 379/88.17 |
| 2002/0035728 A1 | * | 3/2002 | Fries ............ 725/68 |

FOREIGN PATENT DOCUMENTS

| | | | |
|---|---|---|---|
| EP | 0 480 634 A2 | 4/1992 | ............ H04Q/11/04 |
| EP | 0 845 894 A2 | 6/1998 | |
| WO | WO 97/12486 | * 4/1997 | ............ H04N/7/16 |

* cited by examiner

*Primary Examiner*—Andrew Faile
*Assistant Examiner*—Chris Nalevanko
(74) *Attorney, Agent, or Firm*—Sughrue Mion, PLLC (57) ABSTRACT

System for providing CATV subscribers an access to a UMS (Unified Messaging System) and/or VMS (Voice Mail System), wherein each subscriber is provided with a TV set connected to the CATV network directly-or-through a set-top box. The system comprises a connection between subscribers of the CATV network and the UMS and/or VMS and an interface for permitting exchange of information between the subscribers and the UTMS and/or VMS and a client software for the UMS and/or VMS, which when the connection is through the set-top box resides on, or is coupled to, the set-top box. The interface may comprise a UMS and/or VMS handler and a CATV network handler for providing data connection between the UMS and/or VMS and the subscribers. The interface may also comprise a multimedia message management interposed between the UMS and/or VMS handler and the CATV network handler.

31 Claims, 5 Drawing Sheets

METHOD AND APPARATUS FOR PROVIDING VOICE/UNIFIED MESSAGING SERVICES USING CATV TERMINALS

FIELD OF THE INVENTION

The present invention relates to the field of communication. More particularly, the invention relates to a method and apparatus for providing unified messaging services over CATV infrastructure, to a user connected to a data network through his TV set.

BACKGROUND OF THE INVENTION

The increase in the use of mail services has caused a great deal of inconvenience, since for each mail service one needs a different type of terminal—telephone for voice mail, fax for hard copy and PC for e-mail. This resulted in enormous effort expended in collecting and sending mail. Due to this problem, an approach called "Unified Messaging" was born. "Unified messaging" is the integration of several different communications media, which enables users to retrieve voice, fax, and e-mail messages from a single terminal, such as telephone (mobile or fixed) or Internet-connected PC. Collecting and sending mail from a single source using a single interface saves a great deal of time and labor.

CATV (Cable TV) networks are widespread and intensively used for offering and broadcasting a variety of video services, including off-air channels, distant channels and satellite-delivered programs, to most homes in United States. These extra channels significantly enrich the capability of each subscriber to find and watch attractive programs, which would not be received by a conventional antenna. Moreover, several information services were added to the video channels, using the relatively wide bandwidth that can be exploited by (coaxial) cable infrastructure.

With time, supplementary services have been provided to CATV subscribers, which use the existing infrastructure to deliver digital data. These services include interactive TV sets, which comprise a keyboard and a digital converter, through which a subscriber can add textual objects to the displayed video images, and also can receive and transit messages to other subscribers. Moreover, several devices (sometimes called "set-top boxes") have been developed, which enable TV sets to be utilized as a user interface to the Internet. These devices contain a Web browser and operate in accordance with the common Internet protocols (TCP/IP).

The current technology does not employ extant CATV infrastructures for providing advanced telecommunication services. Rather, several VMS (Voice Mail System) and UMS and/or VMS (Unified Messaging System) providers of advanced telecommunication services offer their services by using cellular and/or wireline telephone handsets to interact with the subscriber. Alternatively, the subscriber can interact with these services over the Internet, using his PC as an interface. However, these services lack security and privacy, since they share a common communication channel (the data network) between multiple subscribers, or use wireless transmission, which can be received and demodulated by unauthorized eavesdroppers.

Peach Technologies' (www.peach-network.com) Access Channel offers a range of Microsoft's Windows 95/98™ based applications, using dedicated software and associated servers that operate in combination with digital set-top boxes, such as interactive network boxes and Explorer 2000™.

WebTV provides an integrated Internet browsing solution and content service for cable operators.

WorldGate Communications provides Internet TV services including full Web access, e-mail and Channel Hyperlink (SM) using an analog or digital cable terminal. Worldgate provides the service operator with additional revenues through subscription fees, advertising, and transactions on their network.

All the methods described above have not yet provided solutions to the problem of using a TV set of a CATV subscriber as a terminal for Unified Messaging systems.

It is, therefore, an object of the present invention to provide a method and system for using TV set of CATV subscriber as a terminal for Unified Messaging systems, including Voice Mail.

It is yet another object of the invention to provide a method and a system for providing all VMS (Voice Mail System) and UMS (Unified Messaging System) services, using TV sets as the subscriber's terminal.

It is another object of the invention to provide a method and system for VMS and/or UMS, services with improved security, improved privacy and high-speed transmission.

It is another object of the invention to provide a method and system for providing VMS and/or UMS services, which is compatible with the existing messaging services.

It is a further object of the invention to provide a new type of terminal for accessing Unified Messaging systems, which exploits existing infrastructure.

It is a further object of the invention to provide new channel for browsing multimedia messages, including video-mail.

Other objects and advantages of the invention will become apparent as the description proceeds.

SUMMARY OF THE INVENTION

The present invention is directed to a system for providing CATV subscribers an access to a UMS (Unified Messaging System) and/or VMS (Voice Mail System), wherein each subscriber is provided with a TV set connected to the CATV network directly or through a set-top box, comprising:

a) A connection between subscribers of the CATV network and the UMS and/or VMS and an interface for permitting exchange of information between said subscribers and said UMS and/or VMS;

b) A client software for the UMS and/or VMS which resides on said set-top box;

The said interface comprises a UMS and/or VMS handler and a CATV network handler for providing data connection between the UMS and/or VMS and the subscribers. Preferably, the interface further comprises one or more of the following components: a multimedia (such as text, voice and video) message management for handling the message flow and getting messages from said UMS and/or VMS; a database for storing subscriber's preferences and other parameters; a format server for formatting the display of the information that will appear on the subscriber's TV set.

Preferably, the system according to the invention further comprises multimedia-input devices for inputting information into the UMS and/or VMS. Said devices may be chosen from among keyboard means, microphones and touch-screen inputs.

Another aspect of the invention, is a method for providing CATV subscribers an access to a UMS (Unified Messaging System) and/or VMS (Voice Mail System), wherein each subscriber is provided with a TV set connected to the CATV network directly or through a set top box, comprising:

a) Providing connecting means for establishing a connection for transmitting digital information from a set-top box residing at the subscriber's part to UMS and/or VMS and vice-versa;

b) Requesting information on the subscriber's part from UMS and/or VMS through said connecting means by inputting a request for information into said connecting means;

c) Processing said request at the UMS and/or VMS and transmitting the requested information through said connecting means.

Preferably, the method of the invention further comprises inputting information into said connecting means, and/or converting any information to be transmitted into a form adequate for transmission, and/or displaying the list of the received messages on the subscriber's TV, and/or forwarding messages from one subscriber to another. The method may also comprise initiating a message at the subscriber's part, recording said message by using multimedia means, and transmitting said message to the UMS and/or VMS.

The subscriber may ask for displaying the list of the received messages, displaying some or all the messages one by one, delete a message, forward a message to other user and so forth; and may also initiate a message, record it using multimedia means, and transmit it to the UMS and/or VMS.

BRIEF DESCRIPTION OF THE DRAWING

The above, as well as additional characteristics and advantages of the invention, will be better understood through the following illustrative and non-limitative detailed description of preferred embodiments thereof, with reference to the appended drawings, wherein.

DETAILED DESCRIPTION OF PREFERRED EMBODIMENTS

The invention provides a method and system for using the CATV (Cable TV) as a terminal for accessing and/or interacting with a Unified Messaging system. The infrastructure for the invention is based on technology that already exists in most homes and can serve as a backbone for the TV Messaging System (TVMS).

The invention operates in CATV networks with a digital set-top box that supports forward and backward transmission (full-duplex) of messages and data.

A set-top box is a device that enables a TV to become a user interface to the Internet via the CATV system. It is a specialized computer that can "talk" to the Internet. It contains a Web Browser, which actually is a Hypertext Transfer Protocol client. According to a preferred embodiment of the invention, the set-top should be digital and support two-way communication. The invention makes use of the fact that the set-top box is programmable. Such a set-top may be "Explorer-2000" manufactured by Scientific-Atlanta, USA.

According to a preferred embodiment of the invention, the TVMS comprises two parts:

1. The Client Application. The part of the application that is executed inside the set-top box. It provides the application's services to the subscriber, usually through a graphical user interface that displays the information on the screen.

The client application performs the following operations:

Determines the format of the TVMS display;

displays the message status;

displays a menu from which the subscriber can select a desired operation (such as Send, Receive, Status);

saves the updated subscriber information, which is used to characterize the display format;

handles the input from the input-devices, such as keyboard;

sends and services IP messages to and from the application server;

receives MPEG-2 (MPEG-2 is a standard for compressing and decompressing multimedia data, such as video) data from the Application Server and displays it on the TV set; and connects to other smart ports, such as digital cameras and video cameras, in order to deal with "smart" mails.

As opposed to telephone lines, the bandwidth of signals, which can propagate CATV infrastructure reliably, is wide. This enables to transmit data that requires higher rates (e.g. video and multimedia). Therefore, because it allows the implementation of video applications, this system allows better performance than telephone lines.

2. The Server Application, i.e. the TVMS, supplies the service provided by the application client. The data used by the application client is generally stored on the server. Usually the data is transmitted continuously, or on demand, to a specific subscriber's set-top box.

The Server Application is responsible for the connection to the UMS and/or VMS and other Messaging servers. It performs the following functions:

sends broadcast and unicast messages MPEG-2 formatted to the set-top boxes;

sends IP messages to the Client server

According to a preferred embodiment of the invention, the system provides three main transmission options:

broadcasting to a plurality of subscribers, i.e. to send the same data to a plurality (or even all) of top-set boxes connected to the CATV system;

sending private data audio-video streams coded in MPEG-2, to a specific subscriber; and sending IP data—for transmission of data between client application and the server application.

While connecting to the Internet network is possible from any location (via telephone lines), connection to the CATV can be carried out only by physical connection to the CATV wires. This is possible only from a limited area, where the CATV is distributed. Therefore, the Internet network is more vulnerable to demodulation by unauthorized eavesdroppers than the CATV network.

Figure 1:
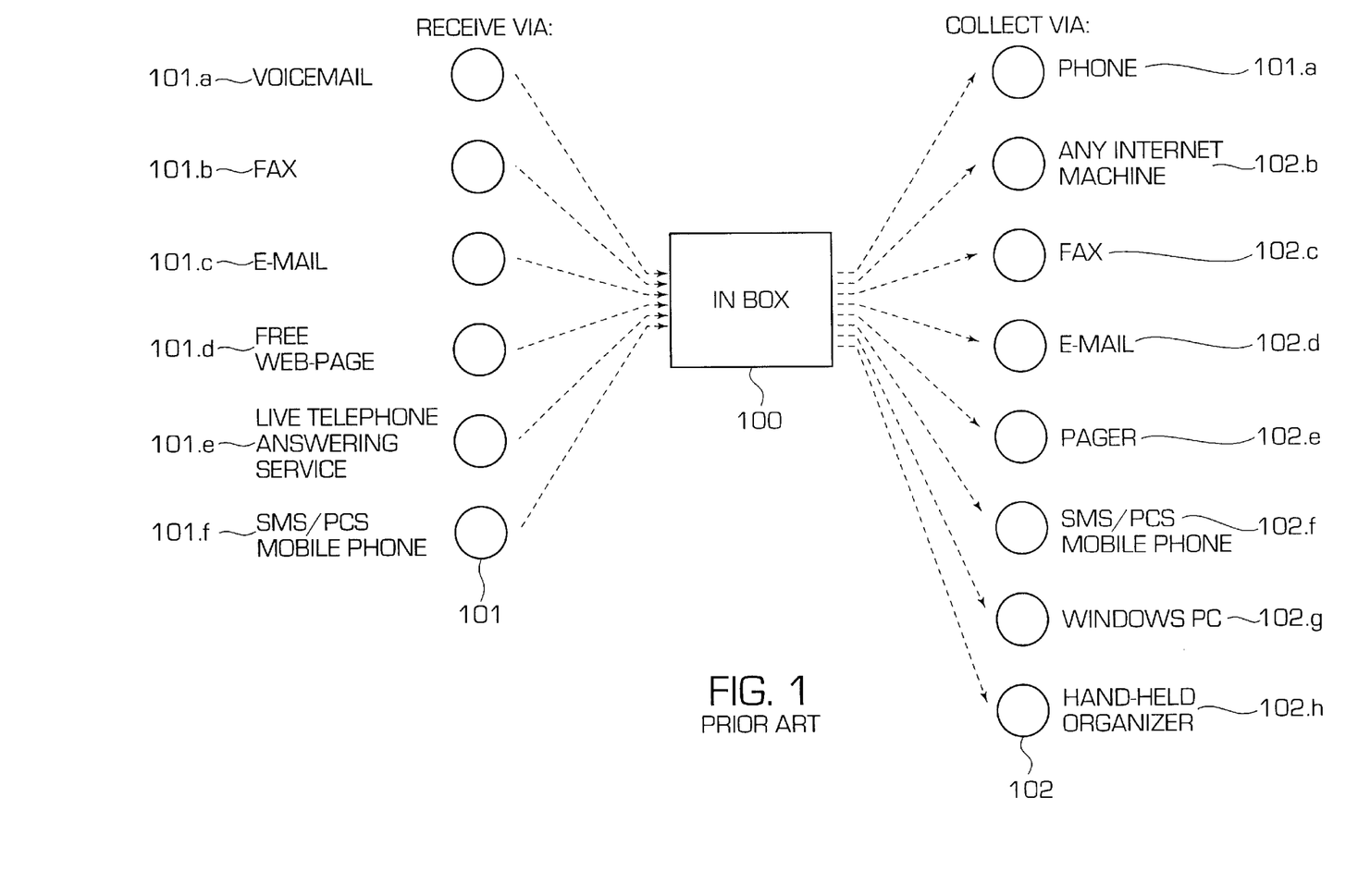
FIG. 1 schematically illustrates a conventional Unified Messaging System.

FIG. 1 schematically illustrates a conventional Unified Messaging System. Messages are received via voicemail, fax, e-mail, web-page, answering machine, or SMS (Short Message Service)/PCS (Personal Communications Services) 101a to 101f, respectively. The received messages 101a to 101f are aggregated in "In-box" 100. From "In-box" 100 the messages are transferred to the user's terminal, which may be telephone, Internet machine, fax, e-mail, pager, SMS/PCS, PC and organizer 102a to 102h, respectively.

Figure 2:
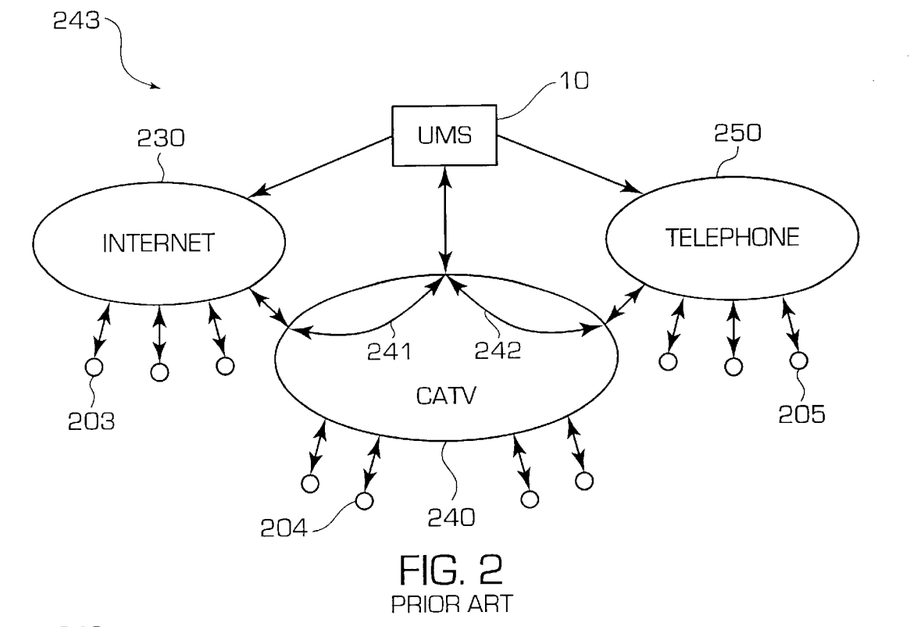
FIG. 2 schematically illustrates the data flow between a UMS and/or VMS, a telephone network and an Internet network, according to prior art.

FIG. 2 schematically illustrates the data flow between a UMS and/or VMS, a telephone network and an Internet network, according to the prior art. The bi-directional arrows represent bi-directional communication channels.

Users 203 are connected to the Internet network 230, users 204 to the CATV network 240 and users 205 to the telephone network 250.

Channel 241, which is a part of the CATV 240, is exploited as a data-conveying channel between UMS and/or VMS 10 and the Internet network 230. Channel 242, which is also a part of the CATV 240, is exploited as a data-conveying channel between UMS and/or VMS 10 and the telephone network 250. Users 204 are not able to use UMS and/or VMS 10.

Figure 3:
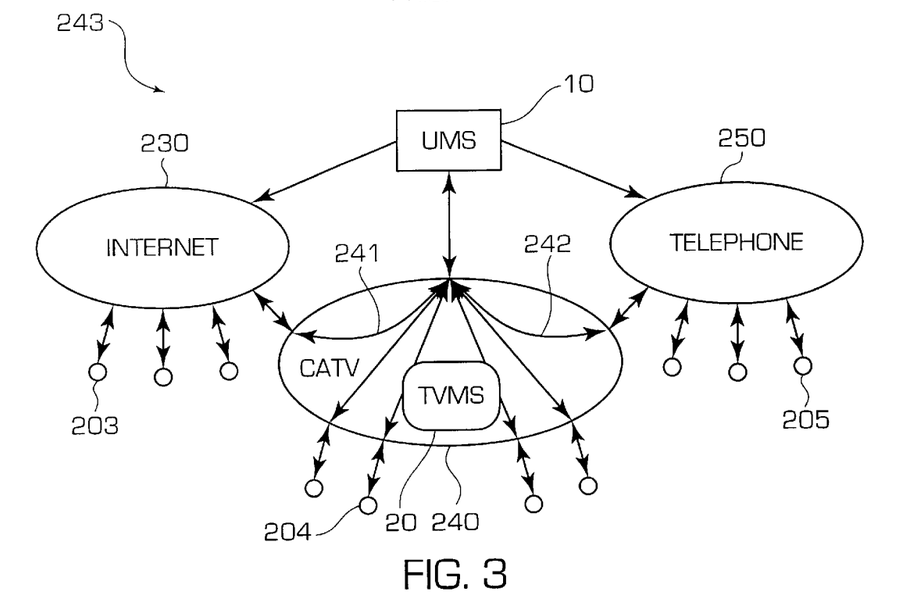
FIG. 3 schematically illustrates the data flow between a UMS and/or VMS, a telephone network and an Internet network, according to a preferred embodiment of the invention.

FIG. 3 schematically illustrates the data flow between a UMS and/or VMS, a telephone network and an Internet network, according to a preferred embodiment of the invention. Due to the TVMS 20, which is connected to the CATV servers, the CATV users are able to use the UMS and/or VMS 10.

Figure 4:
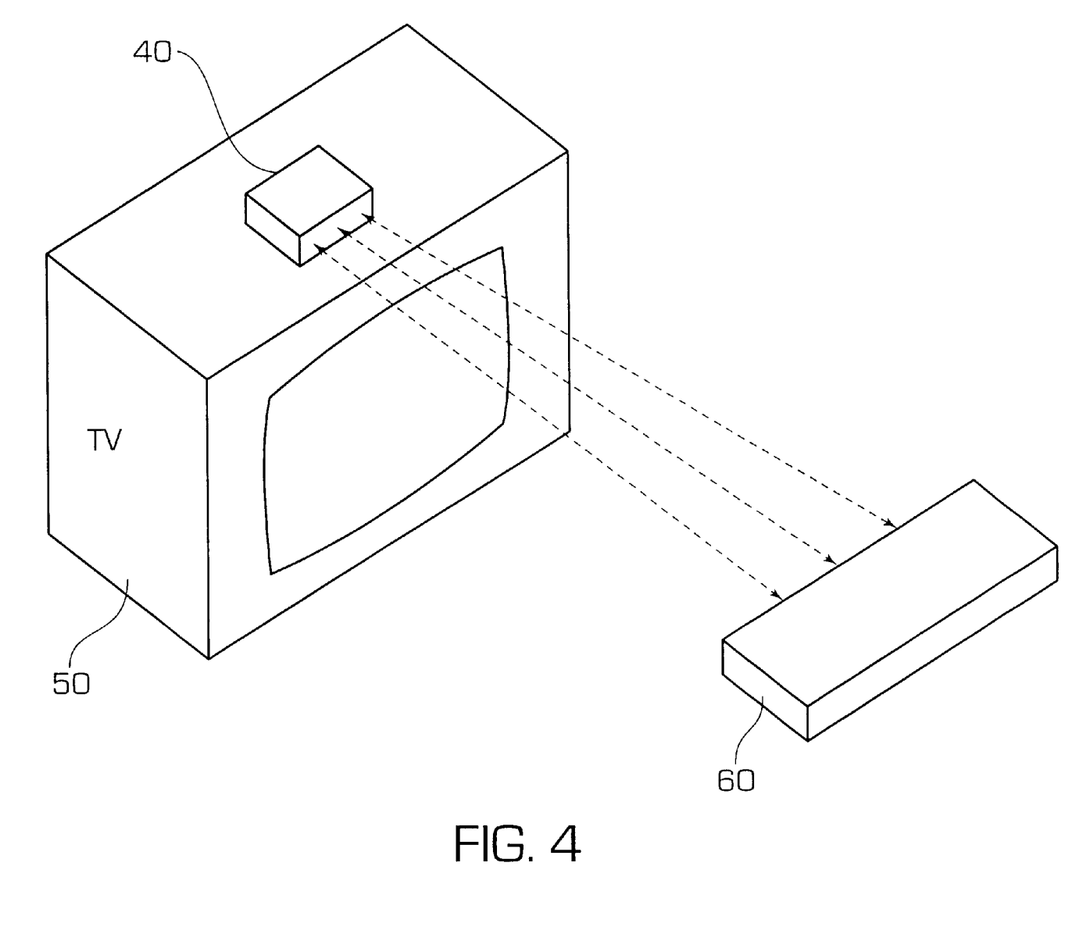
FIG. 4 schematically illustrates the structure of a TVMS terminal, according to a preferred embodiment of the invention.

FIG. 4 schematically illustrates the structure of a TVMS terminal, according to a preferred embodiment of the invention. TV set 50 is used for displaying means Top-set box 40 is operated by the smart terminal 60. The smart terminal may comprise input device such as keyboard, microphone and camera and a remote control.

Figure 5:
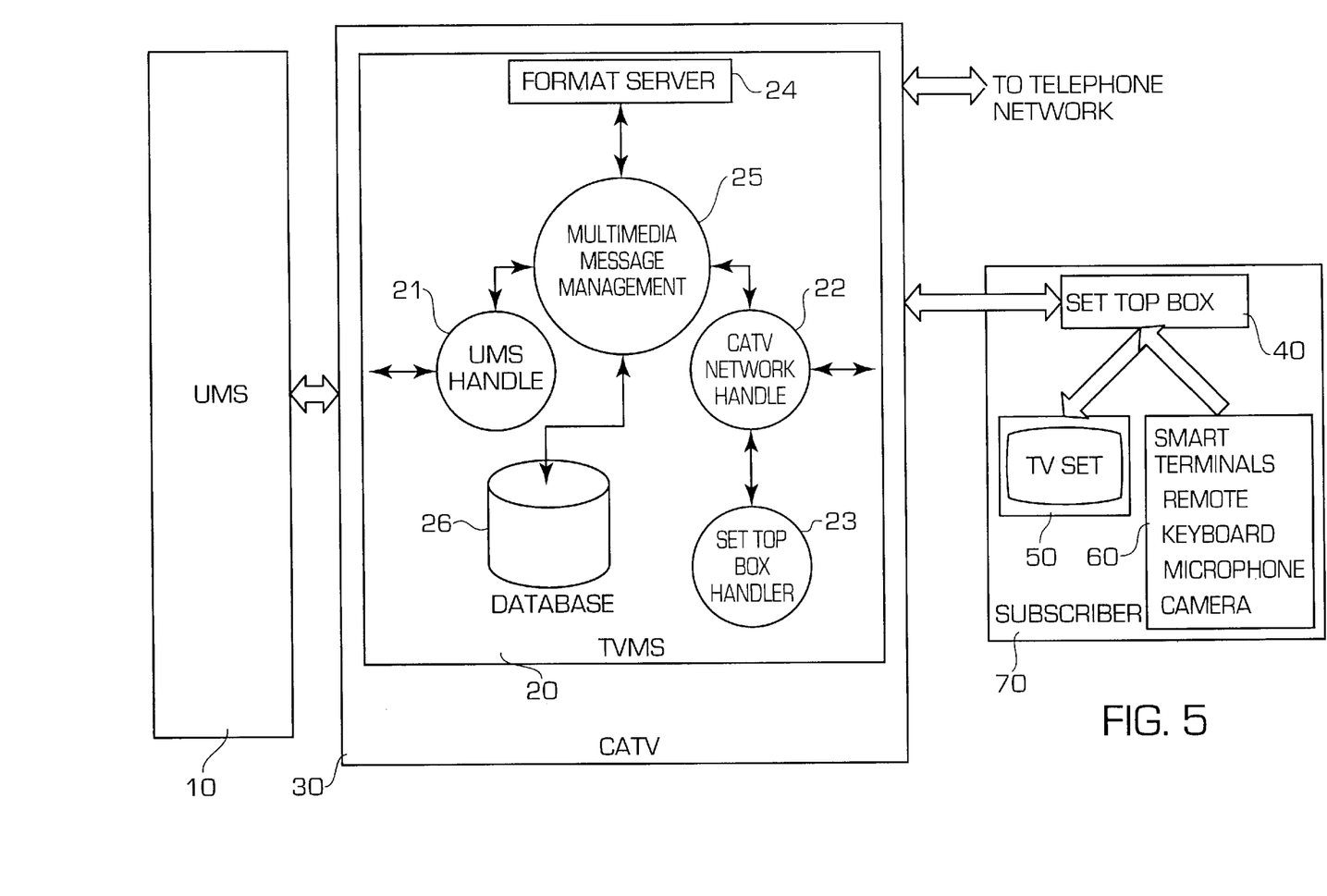
FIG. 5 schematically illustrates a block diagram of TVMS, according to a preferred embodiment of the invention.

FIG. 5 schematically illustrates a block diagram of TVMS, according to a preferred embodiment of the invention. The UMS and/or VMS 10 serves the TVMS as an input for the messages and telecommunication services.

The TVMS 20 is the device that gives the CATV 30 network the ability to be connected via data connection to the UMS and/or VMS. The Set-top box 40 contains the Client Software and is programmed for interacting with each subscriber. The TV set 50 is used for displaying messages and text related to the operation of the Smart terminals 60. The set-top box 40, TV set 50 and the smart terminal 60 reside at the subscriber's location 70.

The TVMS comprises the UMS and/or VMS handle 21 which is used for handling the communication to the UMS and/or VMS 10 (i.e. sends queries to the UMS and/or VMS and gets data messages from the UMS); the CATV Network Handle 22, which is used to send and receive messages to and from the user; the Set-Top Box Handler 23; which handles the software download to the set-top box. Actually, the client application is a software which is downloaded to the top-set. The Format Server 24; which is used for formatting the display of the messages on the user's display; the Multimedia Message Management 25, which handles the message flow and response to all the events from the user and UMS AND/OR VMS and the Database 26; which is used for saving user-related information, such as configuration, formats, last message status, etc.

According to a preferred embodiment of the invention, the subscriber uses CATV network TV set as a smart terminal in order to perform the following for all message types:
See message status (New, Saved);
Get message notification;
Receive the message:
  Listen to voice mail;
  Browse Faxes;
  Read e-mail;
  Read SMS;
  Watch and listen to Video mail.
The subscriber can use all of the enhanced mail features for reading, browsing, listening, viewing and watching mail.
The subscriber can make changes in the mail by editing fax messages, enhancing voice messages or enhancing video. The enhanced mail features may also be used for replying.
The subscriber can save, answer and/or forward the messages to other subscribers even it they are not connected to the same network, or even if they employ means for UMS and/or VMS other than TVMS.
The subscriber can initiate new message(s) to other subscriber(s), to all networks and media, not only to other TVMS subscribers.
The subscriber can determine the default settings for:
  the display format;
  pop up in case of new messages;
  which message box in which network to monitor; and
  which types of media to view, listen and edit.
The subscriber can determine other message boxes, such as voice mail, e-mail and video mail.
The subscriber can provision his mailbox and define as many profiles as he likes.

Figure 6:
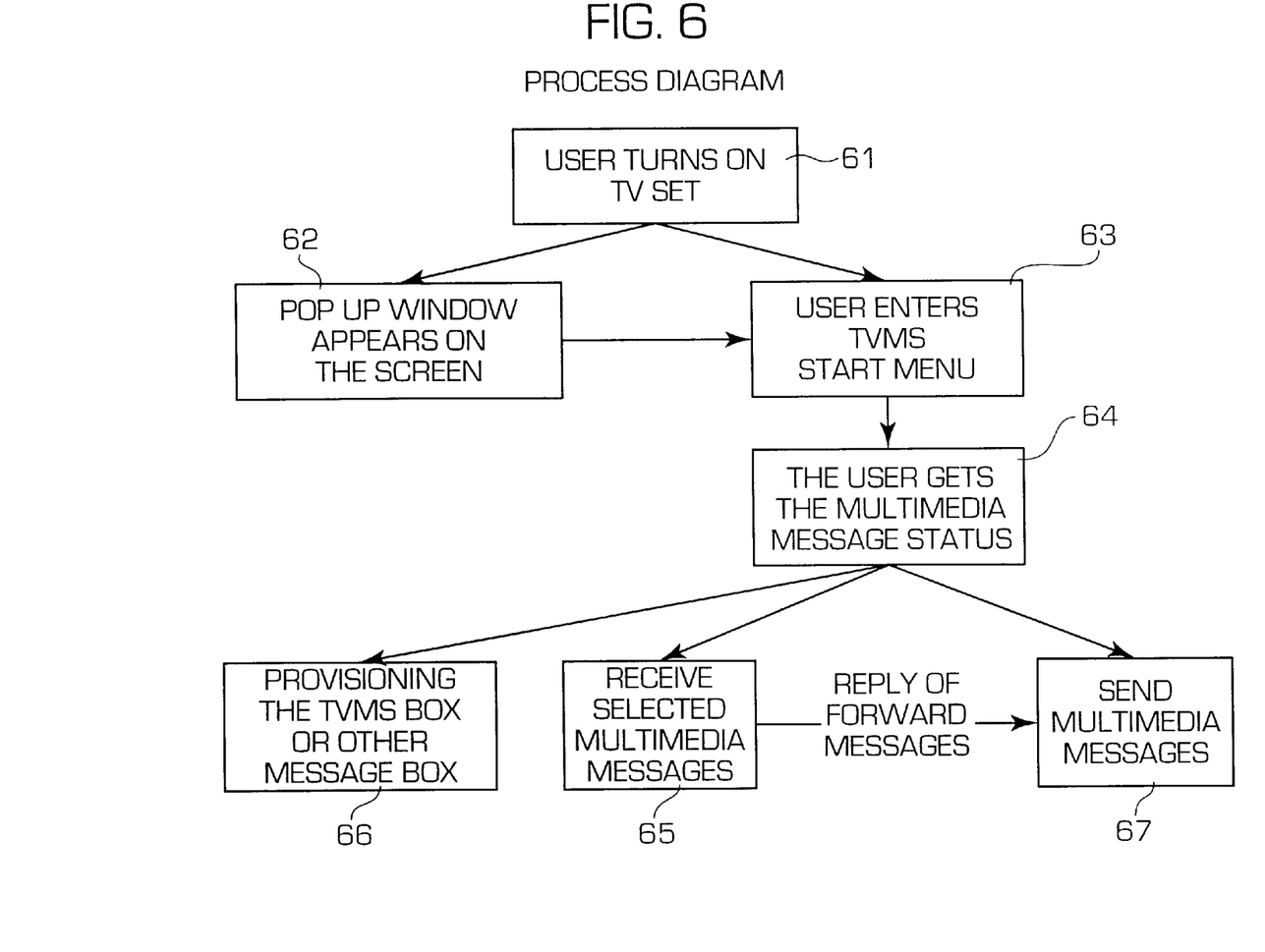
FIG. 6 is a flow chart of the TVMS operations, according to a preferred embodiment of the invention.

FIG. 6 is a flow chart of the TVMS operations, according to a preferred embodiment of the invention.

In step 61, the user turns on the TV. As a result, the TVMS receives a notification message.

In the next step 62, a pop-up window is displayed on the TV screen. The TVMS, through the TVMS client display (if configured to do so), displays on the screen a window that indicates the message status from all configured media (e-mail, voice mail, etc.).

In the next step 63, the user enters the TVMS start menu which is displayed by the client software which resides on his set-top box.

In the next step 64, the user is informed of the multimedia message status. The main status form displays the status of all configured media-messages box status. After displaying the form, the TVMS waits for user's response. The next steps may be 65, 66 and 67.

In step 65, the user selects the media for displaying the message (voice, video). The TVMS receives the data and relays it to the user. The user displays the message and analyzes it with the TVMS tools, which gives him the ability to save, reply, forward or delete the message. If the user wishes to reply or forward the message to other user, control goes to step 67.

In step 67, the user can choose to initiate or reply to multimedia messages. The message can be:
  a) Write text, SMS or e-mail using a remote or keyboard;
  b) Record voice messages, using microphone(s); or
  c) Record a video movie, using a video camera.

In step 66, the user may configure the operation of the TVMS to perform the following operations:
  define pop-ups;
  display formats;
  connect to networks; and
  so forth.

He can also configure other message services, such as e-mail and voice mail.

The above examples and description have, of course, been provided only for the purpose of illustration, and are not intended to limit the invention in any way. As will be appreciated by the skilled person, the invention can be carried out in a great variety of ways, employing more than one technique from those described above, all without exceeding the scope of the claims.

What is claimed is:

1. System for providing CATV subscribers an access to a UMS (Unified Messaging System) and/or VMS (Voice Mail System), wherein each subscriber is provided with a TV set connected to the CATV network directly or through a set-top box, comprising:

a connection between subscribers of the CATV network and the UMS and/or VMS and an interface for permitting an exchange of information between said subscribers and said UMS and/or VMS; and a client software for the UMS and/or VMS, which when the connection is through the set-top box, resides on, or is coupled to, said set-top box, wherein subscribers of the CATV network are able to exchange information with other subscribers of the CATV network via the UMS and/or VMS by transmitting information over only the CATV network.

2. System according to claim 1, wherein the interface comprises a UMS and/or VMS handler and a CATV network handler for providing data connection between the UMS and/or VMS and the subscribers.

3. System according to claim 2, wherein the interface further comprises a multimedia message management interposed between the UMS and/or VMS handler and the CATV network handler.

4. System according to claim 2, wherein the interface further comprises a database for storing subscriber's preferences and other parameters.

5. System according to claim 3, wherein the interface further comprises a format server for formatting the display of the information that will appear on the subscriber's TV set.

6. System according to claim 1, further comprising input devices for inputting multimedia messages.

7. System according to claim 6, wherein the input devices are chosen from among keyboard means, microphones, electronic cameras, video cameras and, three-dimensional input devices.

8. Method for providing CATV subscribers an access to a UMS (Unified Messaging System) and/or VMS (Voice Mail System), wherein each subscriber is provided with a TV set connected to the CATV network directly or through a set-top box, comprising:

providing connecting means for establishing a connection for transmitting digital information from a set-top box residing at the subscriber's location to the UMS and/or VMS and vice-versa;

requesting information from the UMS and/or VMS through said connecting means by inputting a request for information into said connecting means; and processing said request at the UMS and/or VMS and transmitting the requested information through said connecting means, wherein subscribers of the CATV network are able to exchange information with other subscribers of the CATV network via the UMS and/or VMS by transmitting information over only the CATV network.

9. Method according to claim 8, further comprising converting any information to be transmitted into a form adequate for transmission.

10. Method according to claim 8, further comprising displaying a list of all received messages on the subscriber's TV set.

11. Method according to claim 8, further comprising forwarding messages from one subscriber to another.

12. Method according to claim 8, further comprising composing a message at the subscriber's location, recording said message by using multimedia means, and transmitting said message to the UMS and/or VMS.

13. Method according to claim 12, wherein said message comprises multimedia data.

14. Apparatus for providing CATV subscribers an access to a UMS (Unified Messaging System) and/or VMS (Voice Mail System), wherein each subscriber is provided with a TV set connected to the CATV network directly or through a set-top box, comprising an interface for permitting an exchange of information between said subscribers and said UMS and/or VMS, said interface being in cooperation with a client software for the UMS and/or VMS, which, when the connection is through the set-top box, resides on said set-top box or is linked to it, wherein subscribers of the CATV network are able to exchange information with other subscribers of the CATV network via the UMS and/or VMS by transmitting information over only the CATV network.

15. Apparatus according to claim 14, comprising a UMS and/or VMS handler and a CATV network handler for providing data connection between the UMS and/or VMS and the subscribers.

16. Apparatus according to claim 15, further comprising a multimedia message management device or software interposed between the UMS and/or VMS handler and the CATV network handler.

17. Apparatus according to claim 15, further comprising a database for storing subscriber's preferences and other parameters.

18. Apparatus according to claim 16, further comprising a format server for formatting the display of the information that will appear on the subscriber's TV set.

19. Apparatus according to claim 14, further comprising input devices for inputting multimedia messages.

20. Apparatus according to claim 19, wherein the input devices are chosen from among keyboard means, microphones, electronic cameras, video cameras and three-dimensional input devices.

21. A system according to claim 1, wherein the interface is provided on the CATV network.

22. A system according to claim 21, wherein the set-top box is connected to the interface.

23. A method according to claim 8, wherein the connecting means is located on the CATV network.

24. An apparatus according to claim 14, wherein the interface is provided on the CATV network.

25. An apparatus according to claim 24, wherein the set-top box is connected to the interface.

26. A system according to claim 21, wherein the interface is able to send a broadcast message to all of the subscribers of the CATV network.

27. An method according to claim 23, wherein the connecting means is able to send a broadcast message to all of the subscribers of the CATV network.

28. An apparatus according to claim 24, wherein the interface is able to send a broadcast message to all of the subscribers of the CATV network.

29. A system according to claim 1, wherein subscribers of the CATV network are able to exchange information with users that are not subscribers of the CATV network utilizing the CATV network and a second communication network.

30. A method according to claim 8, wherein subscribers of the CATV network are able to exchange information with users that are not subscribers of the CATV network utilizing the CATV network and a second communication network.

31. An apparatus according to claim 14, wherein subscribers of the CATV network are able to exchange information with users that are not subscribers of the CATV network utilizing the CATV network and a second communication network.

* * * * *